(12) United States Patent
Fillaud

(10) Patent No.: US 9,494,051 B2
(45) Date of Patent: Nov. 15, 2016

(54) COUNTER PLATE AND TURBO MACHINE COMPRISING A COUNTER PLATE

(71) Applicant: SNECMA, Paris (FR)

(72) Inventor: Nicolas Fillaud, Moissy-Cramayel (FR)

(73) Assignee: SNECMA, Paris (FR)

( * ) Notice: Subject to any disclaimer, the term of this patent is extended or adjusted under 35 U.S.C. 154(b) by 151 days.

(21) Appl. No.: 14/405,565

(22) PCT Filed: May 30, 2013

(86) PCT No.: PCT/FR2013/051222
§ 371 (c)(1),
(2) Date: Dec. 4, 2014

(87) PCT Pub. No.: WO2014/016480
PCT Pub. Date: Jan. 30, 2014

(65) Prior Publication Data
US 2015/0139794 A1 May 21, 2015

(30) Foreign Application Priority Data
Jun. 5, 2012 (FR) .................................... 12 55229

(51) Int. Cl.
*F01D 25/24* (2006.01)
*F01D 25/28* (2006.01)
(52) U.S. Cl.
CPC ............. *F01D 25/243* (2013.01); *F01D 25/28* (2013.01); *Y10T 403/645* (2015.01)

(58) Field of Classification Search
CPC .......... F01D 5/243; F01D 5/28; F16B 5/0635; Y10T 403/64; Y10T 403/645; Y10T 403/648; Y10T 403/642
See application file for complete search history.

(56) References Cited

U.S. PATENT DOCUMENTS 2,628,067 A    2/1953  Lombard
4,074,914 A *  2/1978  Novotny ............... F01D 25/243
                                            285/405
(Continued)

FOREIGN PATENT DOCUMENTS

CA      2517799 A1 *   3/2006   ............ F01D 11/001
DE  EP 2025882 A1 *    2/2009   ........... F01D 25/243
(Continued)

OTHER PUBLICATIONS

French Preliminary Search Report and Written Opinion issued Feb. 21, 2013 in Patent Application No. FR 1255229 (with English translation of categories of cited documents).
(Continued)

*Primary Examiner* — Jonathan Masinick
(74) *Attorney, Agent, or Firm* — Oblon, McClelland, Maier & Neustadt, L.L.P.

(57) ABSTRACT

A counter plate for a turbo machine, including: a first external surface and a second external surface, which are substantially parallel; the first external surface of the counter plate creates a continuous ring or continuous ring segment and includes a first series of holes through which fasteners can pass; the second external surface of the counter plate including a plurality of surfaces for supporting heads of the fasteners, the support surfaces including a second series of holes, positioned facing the first series of holes, so that the fasteners can pass through the holes in the counter plate.

7 Claims, 3 Drawing Sheets

(56) References Cited

U.S. PATENT DOCUMENTS

| | | | | |
|---|---|---|---|---|
| 5,090,865 A * | 2/1992 | Ramachandran | F01D 5/066 | 285/405 |
| 5,226,788 A * | 7/1993 | Fledderjohn | F01D 5/066 | 411/84 |
| 6,770,825 B1 * | 8/2004 | Hildebrand | F02P 7/021 | 123/146.5 R |
| 6,941,633 B2 * | 9/2005 | Brooks | B25B 27/16 | 29/239 |
| 2005/0132707 A1 | 6/2005 | Gebhardt | | |
| 2006/0193721 A1 | 8/2006 | Adam et al. | | |
| 2008/0115454 A1 | 5/2008 | Xie | | |
| 2008/0120841 A1 | 5/2008 | Ring et al. | | |
| 2010/0011780 A1 * | 1/2010 | Varney | F01D 25/243 | 60/796 |
| 2012/0023968 A1 * | 2/2012 | Shteyman | F01D 25/243 | 60/796 |
| 2012/0211490 A1 * | 8/2012 | Su | B65D 88/34 | 220/216 |
| 2016/0084166 A1 * | 3/2016 | Svihla | F02C 7/20 | 60/605.1 |

FOREIGN PATENT DOCUMENTS

| | | | |
|---|---|---|---|
| EP | 1 698 761 A2 | 9/2006 | |
| EP | 1923578 A2 * | 5/2008 | ............ F16B 5/0635 |
| EP | 1 927 728 A2 | 6/2008 | |
| EP | 1 930 552 A2 | 6/2008 | |
| FR | EP 2554822 A2 * | 2/2013 | ............ B64D 33/02 |
| GB | 715086 A * | 9/1954 | ............ F01D 5/066 |
| GB | 2 442 112 A | 3/2008 | |
| GB | EP 2543828 A2 * | 1/2013 | ........... F01D 25/243 |
| JP | WO 2012147802 A1 * | 11/2012 | ............ F01D 9/02 |
| WO | WO 03/044329 A1 | 5/2003 | |

OTHER PUBLICATIONS

International Search Report and Written Opinion issued Oct. 11, 2013 in PCT/FR2013/051222 (with English translation of categories of cited documents).

International Search Report issued Oct. 11, 2013 in PCT/FR2013/051222 filed May 30, 2013.

* cited by examiner

COUNTER PLATE AND TURBO MACHINE COMPRISING A COUNTER PLATE

FIELD OF THE INVENTION

The invention relates to a counter-plate, designed to be positioned between flanges in a turbomachine.

The invention also relates to a turbomachine including such a counter-plate.

PRESENTATION OF THE PRIOR ART

In a turbomachine (see FIG. 1), certain parts comprise a flange 110, which is attached to an mounting flange 111, generally by means of screws 108. These two flanges are generally annular, or form an annular segment.

This can for example be the flange 110 of a casing 112, attached to a mounting flange 111.

The mounting flange is sometimes scalloped. It is used in certain cases for supporting equipment needed for the operation of the turbomachine. Equipment supports are thus regularly bolted to the holes made in the mounting flange.

In operation, mechanical loads exist between the flange and the mounting flange, particularly due to the vibrations of the part bearing the flange.

Thus, deterioration is observed due to peening of the inner surface of the holes, particularly the holes of the flange. This results particularly from tightening of the attachment screws.

The flange itself undergoes stresses which can damage it.

Solutions aimed at correcting these problems include for example increasing the number of screws so as to increase the number of tightening zones. Other solutions require the addition of washers.

The face of the flange in contact with the mounting flange also undergoes a galvanic corrosion phenomenon. This can in particular be the case when the mounting flange is made of aluminum, and the part bearing the flange is of composite material.

Likewise, the interface located between the screws allowing attachment of the flange to the mounting flange and said flange is also the site of a galvanic corrosion phenomenon.

It is known to combat galvanic corrosion by interleaving glued glass plies.

In currently existing solutions, the addition of numerous patches is therefore necessary to correct the various aforementioned problems.

This, however, is detrimental, because increasing the number of parts causes proliferation of manufacturing operations, which are sometimes complex. Moreover, the addition of new parts complicates the assembly operations of the turbomachine, like for example the washers, which are not held in position when the screws attaching the flange to the mounting flange are withdrawn.

The invention aims to obtain a simple and effective solution to the aforementioned problems.

PRESENTATION OF THE INVENTION

To this end, the invention proposes a turbomachine including a flange, an mounting flange to which the flange is attached, characterized in that the turbomachine includes a counter-plate, the counter-plate including a first outer surface and a second outer surface, substantially parallel, the first outer surface of the counter-plate forming a continuous ring, or a segment of a continuous ring, and including a first series of holes for the passage of fastening means, the second outer surface of the counter-plate including a plurality of support surfaces for the heads of fastening means, the support surfaces including a second series of holes, arranged facing the first series of holes, for passage of the fastening means through the holes in the counter-plate, the first outer surface of the counter-plate consisting of a material allowing prevention of galvanic corrosion that can form between the flange and the mounting flange, and the first outer surface separating the flange and the mounting flange.

The invention is advantageously supplemented with the following features, taken together or in any technically possible combination:

- the second outer surface of the counter-plate consists of a material allowing the prevention of galvanic corrosion which can form between the fastening means and the flange;
- the second outer surface is a continuous surface;
- the second outer surface is a discontinuous surface;
- the second outer surface is a scalloped surface, the scallops whereof are support surfaces for the heads of the fastening means;
- the first and second outer surfaces are spaced such that the counter-plate grips the flange;
- the flange is fastened to the mounting flange using fastening means passing through the holes in the first and the second outer surfaces of the counter-plate.

The invention makes it possible to solve both the problem of peening and the problems of galvanic corrosion, by means of a single part.

In addition, the invention simplifies assembly/disassembly operations.

PRESENTATION OF THE FIGURES

Other features and advantages of the invention will still appear from the description that follows, which is purely illustrative and not limiting, and must be read with reference to the appended drawings wherein:

FIG. 1, already commented on, shows a turbomachine, including a part and a mounting flange, of the prior art;

DETAILED DESCRIPTION

Figure 1:
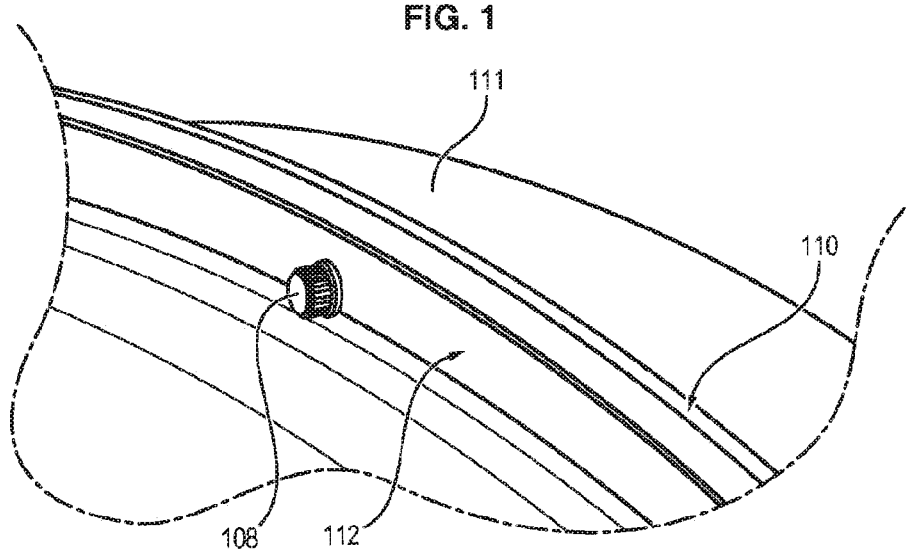
Figure 2:
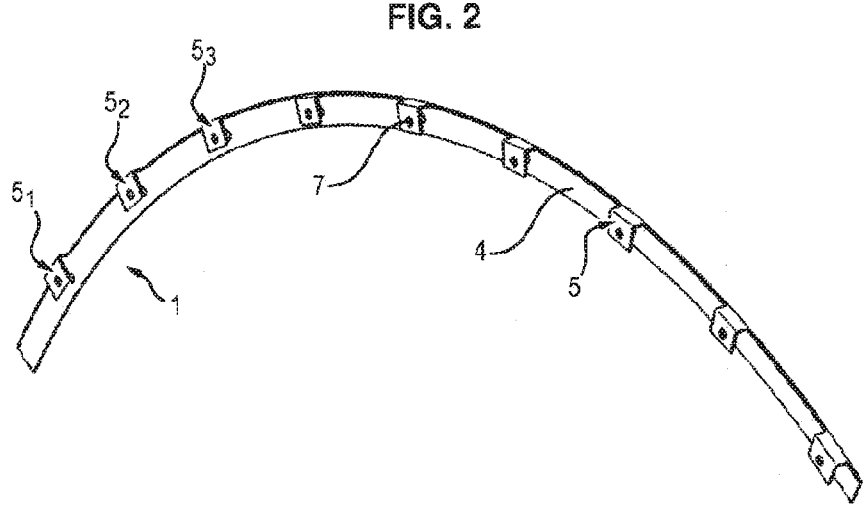
FIG. 2 is a view of an embodiment of a counter-plate according to the invention.
Figure 2:
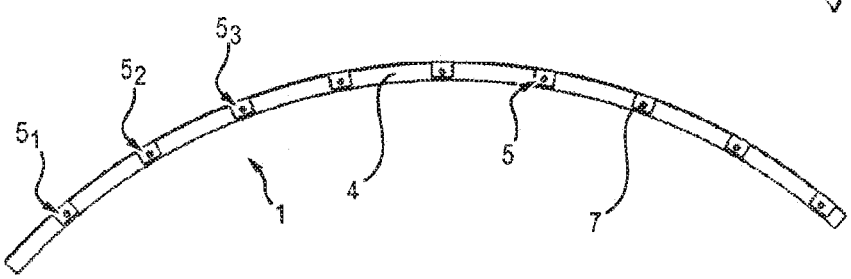

FIG. 2 is a view of an embodiment of a counter-plate 1 according to the invention.

Figure 4:
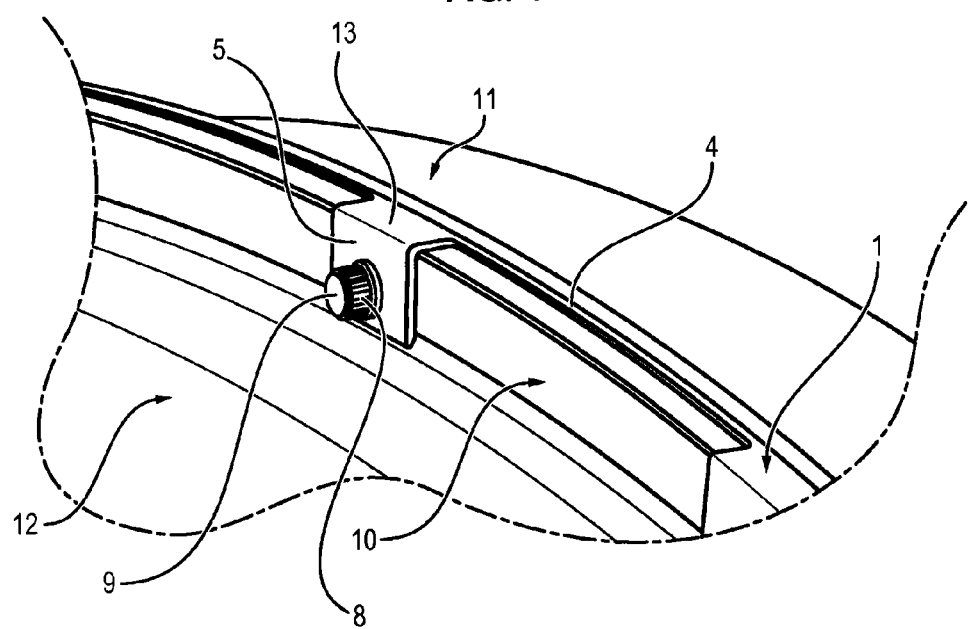
FIG. 4 shows a turbomachine including a counter-plate interleaved between a part and a mounting flange of a turbomachine, according to an embodiment of the invention.
Figure 5:
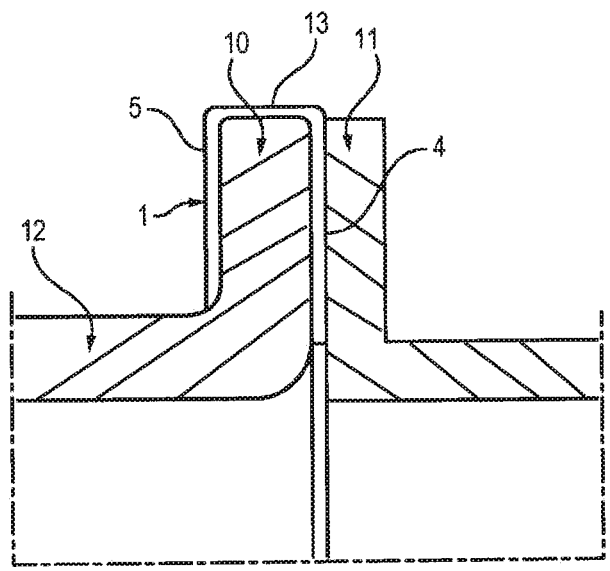
FIG. 5 is a section view of FIG. 4.

As illustrated in FIGS. 4 and 5, this counter-plate is designed to be placed between flanges 10, 11 in a turbomachine.

The flange 10 is the flange of a part 12, said flange 10 needing to be fastened to a mounting flange 11. The part 12 is for example, but without limitation, a casing of the turbomachine.

The flanges are generally annular or axially symmetrical mounting parts.

The counter-plate 1 includes a first outer surface 4 and a second outer surface 5.

These surfaces 4, 5 are connected so as to form a U-shaped section. What is meant by U-shaped that the surfaces 4, 5 are substantially parallel (like the two vertical bars of a "U") and joined by a connecting surface 13 (like the horizontal bar of a "U").

Thus, the cross-section of the counter-plate is not necessarily strictly identical to a U, in that the cross-sections of the surfaces 4, 5 can have different lengths.

Figure 3:
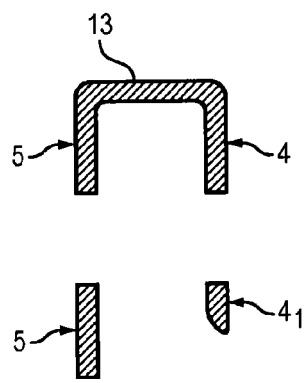
FIG. 3 is a section view of a section of a counter-plate according to an embodiment of the invention.

In one embodiment, the contact area between the first outer surface 4 and the flange 10 is increased. This can be accomplished in particular by placing a contact tab $4_1$ at the end of the first outer surface of the counter-plate, which comes into abutment against the flange 10 (see FIG. 3). This tab $4_1$ has a generally curved end. This allows mechanical reinforcement of the flange 10 with respect to the loads to which it is subjected.

The first outer surface 4 of the counter-plate 1 forms a continuous ring, or a continuous ring segment. This first outer surface 4 includes a first series of holes 6 for passage of fastening means 8. These holes are not necessarily regularly spaced, and can moreover have mutually differing dimensions and/or shapes. The fastening means 8 are for example, but without limitation, screws or rivets.

The second outer surface 5 of the counter-plate 1 has a plurality of surfaces $5_1$, $5_2$, $5_3$, ... for supporting heads 9 of fastening means.

The support surfaces $5_1$, $5_2$, $5_3$, ... include a second series of holes 7, positioned facing the first series of holes 6, for passage of the fastening means 8 through the counter-plate 1.

These support surfaces are configured to support the heads 9 of fastening means 8 designed to pass through the holes 6, 7 of the counter-plate.

Figure 6:
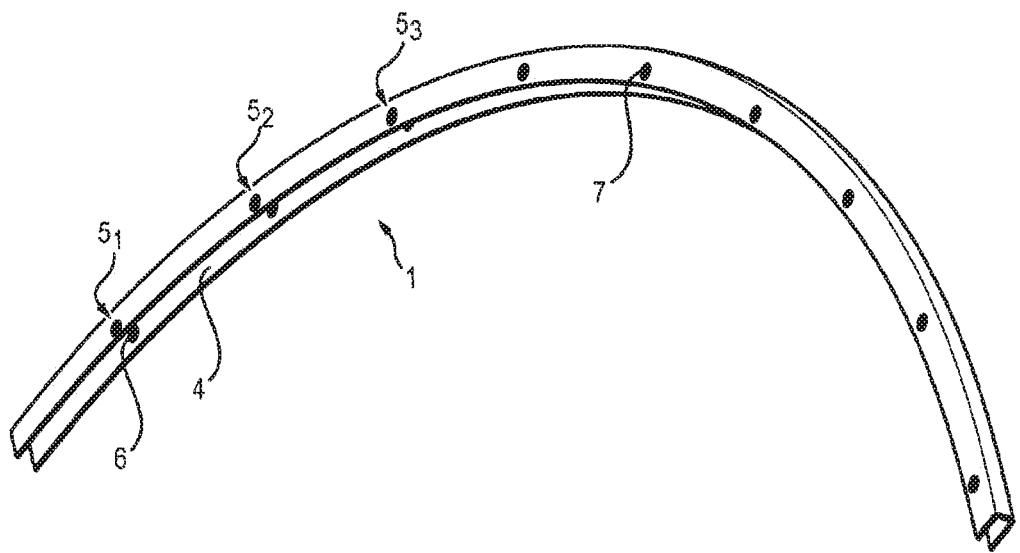
FIG. 6 is a view of another embodiment of a counter-plate according to the invention.

The second outer surface 5 can be continuous, as shown in FIG. 6. In this case, the different support surfaces $5_1$, $5_2$, $5_3$, ... are joined. The second outer surface 5 then describes a continuous ring or ring segment.

Alternatively, the second outer surface 5 is a discontinuous surface. In this case, the different surfaces $5_1$, $5_2$, $5_3$, ... are not joined and are spaced apart from one another. This configuration allows mass saving by reduction of the material used.

A mixed solution, including continuous portions of the second outer surface 5 and discontinuous portion, is also possible.

In one embodiment, the second outer surface 5 is a scalloped surface (see FIGS. 2 and 4), the scallops whereof are surfaces ($5_1$, $5_2$, $5_3$, ... ) supporting the heads of fastening means. The shape of the support surfaces can vary: these can be rectangular, square, or triangular cutouts, or any geometric shape suitable for supporting the heads of fastening means.

The support surfaces can have mutually differing geometries and/or dimensions.

As already mentioned, one problem encountered in mounting the flange is the phenomenon of galvanic corrosion.

Galvanic corrosion is observed if the following three conditions are satisfied simultaneously:

two metals of different types (or one metal and a more noble or more conductive material such as carbon). They form the electrodes of the system: the more noble is the cathode, and is the site of the reduction reactions; the less noble is the anode, and is the oxidation site. The potential difference, of at least 100 mV, is the source of the oxidation-reduction reactions.

an electrolyte in contact with both phases. Its presence provides for the transport of ionic species, and hence of current in the liquid medium.

electrical contact between the two materials. This electrical continuity provides for the transport of electrons between the two phases.

In one embodiment, at least the first outer surface 4 consists of a material not generating galvanic corrosion. In particular, the material of the first outer surface 4 is selected to prevent galvanic corrosion capable of occurring between the flange 10 and the mounting flange 11.

This is for example, but without limitation, TA6V material, or a titanium alloy. This material is insulated by a neutral film (passivation layer), created naturally on the surface by contact with air, which stops galvanic corrosion. Other materials are possible, such as glass plies for example.

Generally, the mounting flange 11 is made of metal, aluminum for example, and the flange 10 is made of carbon or carbon fiber.

Other examples of material for the first outer surface 4 include:

non-conducting elements such as plastics or glass fiber composites;

titanium, certain "Inconel" materials, NiCrMo alloys or stainless steels. These materials have a low potential difference with carbon.

According to one possible aspect, anodizing occurs. In particular, if the first surface made of titanium, and the mounting flange is made of aluminum, the titanium is anodized. This makes it possible to increase the insulation of the elements from the standpoint of galvanic corrosion.

In the case of the carbon/aluminum couple, the aluminum is anodised (abrasion of the carbon with respect to the aluminum).

In one embodiment, the second outer surface 5 of the counter-plate consists of a material allowing the prevention of galvanic corrosion capable of occurring between the fastening means 8 and the flange 10. Materials identical to those described for the first outer surface 4 can be used.

FIGS. 4 and 5 show a turbomachine including:

a flange 10 of a part 12, and a mounting flange 11, on which the flange 10 is mounted.

The mounting flange 11 is used in certain cases to support equipment necessary for the operation of the turbomachine. Equipment supports are thus regularly bolted to holes made in the mounting flange 11.

The turbomachine includes the counter-plate 1 as described previously, positioned between the flange 10 and the mounting flange 11. The counter-plate 1 is interleaved between the flange 10 and the mounting flange 11.

In particular, the first outer surface 4 covers the surface of the flange 10 in contact with the mounting flange 11. Thus, the flange 10 is no longer in direct contact with the mounting flange 11.

The first outer surface 4 separates the flange 10 from the mounting flange 11.

Moreover, the fastening means 8 connect the flange 10 with the mounting flange 11, and pass through the holes 6, 7 of the first outer surface 4 and of the second outer surface 5.

In one embodiment, the first and the second outer surfaces 4, 5 are spaced so that the counter-plate 1 grips the flange 10. In particular, the outer surfaces 4, 5 of the counter-plate 1 grip the flange 10.

This allows the counter-plate 1 to be held in position even if the fastening means 8 are withdrawn or absent.

On the one hand, the counter-plate 1 allows separation between the flange 10 and the mounting flange 11.

As mentioned previously, the first outer surface 4 of the counter-plate consists of a material allowing for prevention of the galvanic corrosion that can occur between the flange 10 and the mounting flange 11.

According to one aspect, the second outer surface of the counter-plate consists of a material making it possible to prevent the galvanic corrosion which can occur between the fastening means 8 and the flange 10. In particular, the second surface 5 separates the heads 9 of the fastening means 8 of the flange 10.

By appropriate selection of the material of the first outer surface 4 and the second outer surface 5, galvanic corrosion problems are eliminated.

Moreover, the counter-plate 1 makes it possible to avoid the problems of peening of the holes 7 of the flange 10, thanks to the support surfaces $5_1, 5_2, \ldots$ for the heads of the fastening means. Rubbing between the fastening means and the surfaces of the holes are thus reduced.

Moreover, when the counter-plate 1 has a configuration wherein it grips the flange 10, the counter-plate 1 is held in position even during assembly/disassembly operations of the fastening means 8 and of the elements attached to the mounting flange 11 of the turbomachine. Assembly/disassembly operations are thus simplified.

The counter-plate makes it possible to resolve several technical problems thanks to a single part, which reduces costs, complexity and maintenance operations of the turbomachine.

The invention claimed is:

1. A turbomachine comprising:
   a flange;
   a mounting flange to which the flange is mounted;
   a counter-plate including a first outer surface and a substantially parallel second outer surface;
   the first outer surface of the counter-plate forming a continuous ring, or a continuous ring segment, and including a first series of holes for passage of fastening means;
   the second outer surface of the counter-plate including a plurality of support surfaces for heads of fastening means, the support surfaces including a second series of holes, arranged facing the first series of holes, for passage of the fastening means through the holes of the counter-plate;
   the first outer surface of the counter-plate including a material allowing prevention of galvanic corrosion which can occur between the flange and the mounting flange; and
   the first outer surface separating the flange and the mounting flange.

2. The turbomachine according to claim 1, wherein the second outer surface of the counter-plate includes a material allowing prevention of galvanic corrosion which can occur between the fastening means and the flange.

3. The turbomachine according to claim 1, wherein the second outer surface is a continuous surface.

4. The turbomachine according to claim 1, wherein the second outer surface is a discontinuous surface.

5. The turbomachine according to claim 4, wherein the second outer surface is a scalloped surface, scallops whereof are a support surface for heads of the fastening means.

6. The turbomachine according to claim 1, wherein the first and the second outer surfaces are spaced so that the counter-plate grips the flange.

7. The turbomachine according to claim 1, wherein the flange is mounted on the mounting flange by attachment means passing through holes in the first and in the second outer surfaces of the counter-plate.

* * * * *